United States Patent Office.

ROBERT O. LOWREY, OF SALEM, NEW YORK.

Letters Patent No. 77,992, dated May 19, 1868; antedated May 12, 1868.

---

IMPROVED FIBROUS COMPOUND FOR ROOFING AND OTHER PURPOSES.

---

The Schedule referred to in these Letters Patent and making part of the same.

---

TO ALL WHOM IT MAY CONCERN:

Be it known that I, ROBERT O. LOWREY, of Salem, in the county of Washington, and State of New York, have invented certain new and useful Improvements in the Manufacture of Fibrous Compound; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in the up on of vegetable fibre, either alone or with other material, with the silicate of soda, and then treating it with a solution of alum, or alum and salt, for the production of a new compound suitable for roofing and various purposes.

For the production of my article or compound, I take vegetable fibre, ground or otherwise prepared, as for the manufacture of paper, and mix it with silicate of soda. In this condition it forms a pasty mass, and may then be formed into blocks or spread upon roofs or other surfaces like plaster, or rolled or pressed into sheets of any required size or thickness; or, the pasty mass may be moulded or pressed into pipes, buckets, tubs, or any other desired article, either for use or ornament. When thus formed, I treat the compound or article with a solution of alum of any kind, or of alum and salt combined, which converts the silicate of soda into an insoluble silicate that firmly cements the fibrous particles, and at the same time renders the material fire and water-proof.

In covering roofs, the plastic compound may be spread like a mortar over the roof, and then washed with the solution afterward. It thus forms an exceedingly strong roofing-material, that will not crack or check, and is not affected by heat or cold, and that is thoroughly fire-proof. The material or compound thus formed is somewhat pliable, and hence utensils or articles manufactured from it are very strong and tough and not easily broken or injured.

Borax may be added to the solution, if desired, but I do not consider it of any special advantage, the effect being apparently the same without as with it.

For some purposes, when it is desired to produce coarser and heavier articles, I mix with the fibre a portion of sand or other similar matter, instead of using fibre alone, with the silicate of soda, the after-treatment being the same as already described.

In all cases, after the materials have been mixed with the silicate of soda, and sprinkled or treated with the solution, and have become sufficiently hard to be handled, the block or article, in whatever form it may be, is then immersed in the solution, and boiled or kept hot therein for several hours, the length of time depending on its size and other circumstances. Where it is used in the form of a mortar, for roofing and similar purposes, it is obvious that this cannot be done, and in such cases I prefer to apply the solution hot, in the first instance, and then wash with water.

In case there should be an excess of the solution remaining in the block or material, it may be treated with any solution that will decompose it or render it insoluble.

Having thus described my invention, what I claim, is—

The material produced by the union of vegetable fibre, either alone or with sand and similar substances, with silicate of soda, and treated with a solution of alum, or of alum and salt combined, substantially as described.

R. O. LOWREY.

Witnesses:
W. C. DODGE,
P. T. DODGE.